United States Patent [19]

Green

[11] 4,325,398

[45] Apr. 20, 1982

[54] SAFETY AND VENTING VALVES FOR FUEL TANKS CARRIED ON VEHICLES

[75] Inventor: Charles J. Green, Vashon, Wash.

[73] Assignee: G. T. Corporation, Seattle, Wash.

[21] Appl. No.: 170,725

[22] Filed: Jul. 21, 1980

[51] Int. Cl.³ .............................................. F16K 17/36
[52] U.S. Cl. ........................................ 137/39; 137/43; 137/73; 137/202; 137/331
[58] Field of Search .................. 137/38, 39, 43, 44, 137/202, 330, 331

[56] References Cited

U.S. PATENT DOCUMENTS

| 785,594 | 3/1905 | Crispin | 137/202 |
| 1,724,878 | 8/1929 | Jensen | 137/43 |
| 2,677,939 | 5/1954 | Clute | 137/202 X |
| 2,919,707 | 1/1960 | Seidler | 137/39 |
| 3,662,725 | 5/1972 | Dragon | 137/44 X |
| 3,970,098 | 7/1976 | Boswank | 137/43 X |

FOREIGN PATENT DOCUMENTS

| 1150850 | 6/1963 | Fed. Rep. of Germany | 137/202 |
| 853806 | 3/1940 | France | 137/39 |
| 405385 | 2/1934 | United Kingdom | 137/202 |

*Primary Examiner*—Robert G. Nilson

[57] ABSTRACT

A tank venting, pressure and temperature relieving, and spill preventing valve for fuel tanks. The valve has a spin chamber, having generally circular cross sections and at least one side wall inlet opening that is tangentially directed with respect to the circumferences of the cross sections. There is a circular outlet at a normally upper and open end of the chamber. The chamber cross sections decrease in diameter upwardly of the inlet opening to below the outlet opening whereby gas venting through the chamber spins a light weight, bouyant ball around the chamber so as to prevent the ball from closing during venting. The ball valve is adapted to be lifted to seat on the outlet to close it when liquid enters the chamber to a predetermined level. A heavy ball in the chamber holds the light weight valve ball on the seat when the chamber has been tilted a predetermined amount. There is a second heavy ball externally of the chamber adjacent the outlet opening and adapted to move the light weight valve ball off the seat when the liquid is below a predetermined level and the chamber is not tilted, so that the outlet will be open for venting.

29 Claims, 13 Drawing Figures

SAFETY AND VENTING VALVES FOR FUEL TANKS CARRIED ON VEHICLES

BACKGROUND OF THE INVENTION

There is a legal requirement that vent valves on fuel tanks on highway trucks be closable automatically, so that if a truck is tilted or tipped over, there will be no spillage of fuel through the vent valve. It is also necessary that the vent valve be open during normal operation to allow air into the tank as the fuel therein is decreased, and to allow gas to flow out of the tank if the fuel is being increased in the tank. The requirements are the same when the tank and/or fuel therein contracts or expands. It is also necessary that there be safety releases against excessive pressure and excessive temperature in a fuel tank.

Government regulations require that all fuel tank vent valves be designed to prevent liquid spillage at any attitude of the fuel tank.

In the best prior art known to applicant, a ball valve, although not bouyant, is seated too easily, under the influence of gas flowing out of the tank. This occurred because the ball was too close to the seat and the gas pressure activity on the wall around the ball and on the ball was sufficient to seat the valve when it should have remained open. In addition the non-bouyant ball valve would not always seat when vertical or when at less than 30° angles of tilt in the presence of liquid fuel. This was due to respective inaction of two other ball elements in the valve.

SUMMARY OF THE INVENTION

The present invention is an improved venting device for use in tanks which are carried by highway trucks. The device is comprised of a valve which is adapted to be installed so as to have a flow path therethrough to extend generally vertically and which does not shut off venting until the valve body or the flow path axis has been tilted more than 105°.

A valve sealing member, a ball operative to close the valve, is bouyant and of very light weight so that it will seal in any position of the valve when the liquid level in the tank enters the valve and rises so as to float the ball onto the seat. This prevents the tank from overflowing as it is being filled, for example. In the same manner as the tank is tilted and the liquid level rises in the valve, the sealing ball will close the valve as it is floated toward and onto the valve seat.

The sealing ball is contained within a spin chamber housing into which venting gas is directed tangentially so as to rotate the light weight ball. The spin chamber is generally circular, having diameters decreasing toward the valve seat and this arrangement prevents the sealing member from seating during normal venting.

The venting passage through the housing is enlarged over that of the best known prior art to provide for greater gaseous flow volume in both directions. This is made possible by the spinning arrangement which permits the sealing ball to be spaced a considerable distance from the seat during gaseous outflow and inflow.

A heavy ball in the spin chamber normally rests on the bottom thereof and when the valve body is tilted sufficiently, the heavy ball moves the sealing ball onto the valve seat. This shuts off venting and prevents spilling of liquid from the tank in the tilt position.

A second heavy ball upwardly of the spin chamber rides on a channel adjacent the outlet thereof but does not seat on or seal the outlet because radial flow spacing is through the channel. The second heavy ball functions to remove the sealing ball from the seat by contact through the outlet when the valve is vertical and the liquid level which had floated the sealing ball onto the seat has receded. The sealing ball because of its light weight would remain on the seat if any tendency to vent existed in such a situation; thus, the outer heavy ball is required to remove it from the seat to allow venting to occur. Location of the second heavy ball on the channel results in such ball offering no resistance to the seating ball as it seats. The channel also results in a larger flow area for venting air around the second heavy ball than in the prior art.

The valve body is also constructed to provide an enlarged outlet when pressure in the tank exceeds a predetermined amount. A low melting point ring fits on the valve body to open it completely by removal of its top at a predetermined temperature.

Further objects and advantages of the invention may be brought out in the following part of the specifications wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

Referring again to the drawings, in FIGS. 1-6, there is shown a venting valve 10 comprised of a main body 12 having an externally threaded stem 14 adapted to screw into a tapped bore 16 in an upper wall 18 of a fuel tank, carried on a motor vehicle, for example. The stem 14 has a passageway 20 communicating with an upper interior region of the fuel tank and with a cylindrical bore 22 in the valve body upwardly from the stem.

Figures 1, 2, 3, 4, 5, 13:
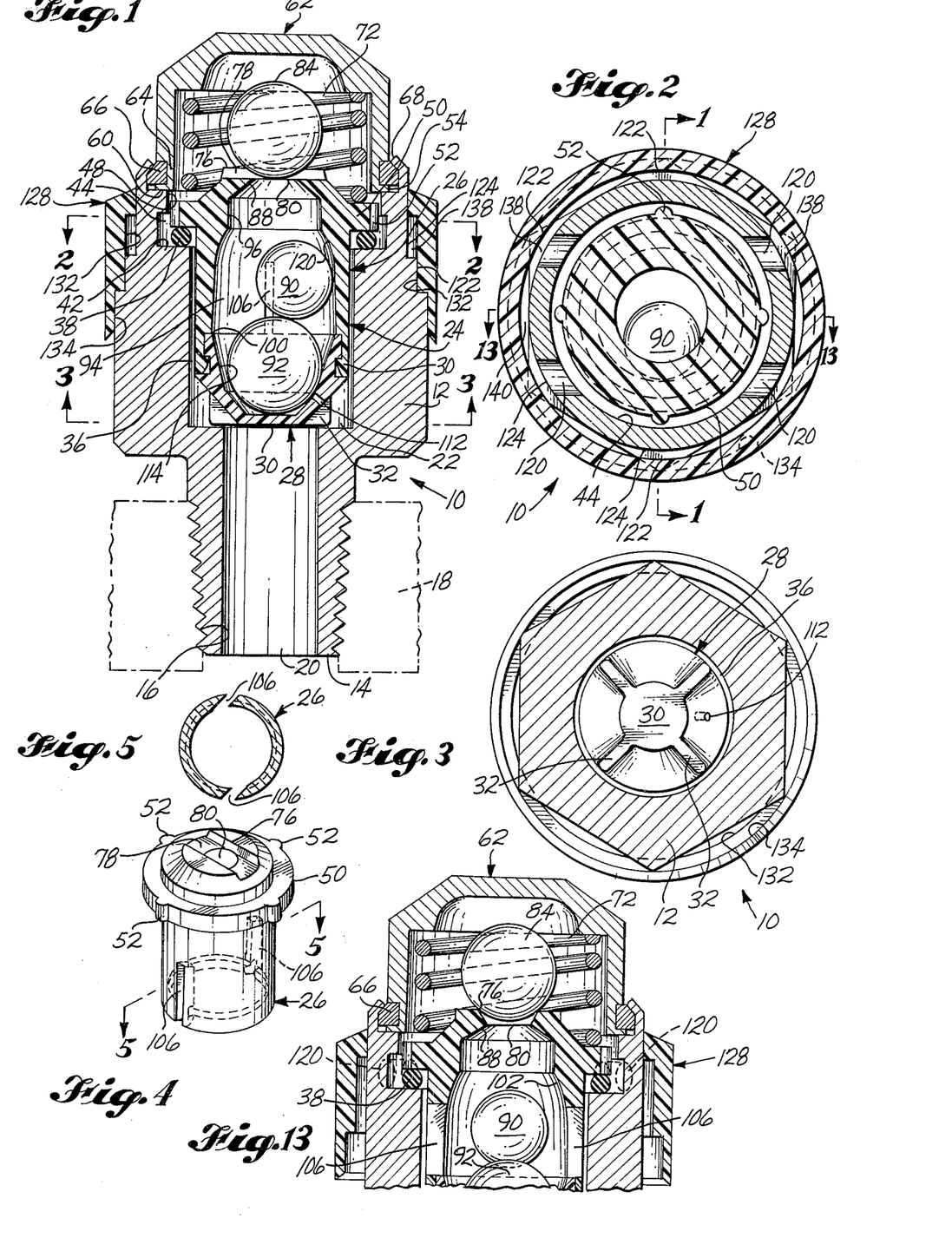
FIG. 1 is an elevational cross-sectional view of a venting valve according to the invention, taken along the line 1—1 in FIG. 2, as it is positioned vertically in an upper part of a fuel tank.
FIG. 2 is a cross-sectional plan view taken along the line of 2—2 of FIG. 1 and rotated 90°.
FIG. 3 is a partially cross-sectional view taken along the line 3—3 in FIG. 1 and rotated 90°.
FIG. 4 is a perspective view of an upper portion of a valve spin chamber housing.
FIG. 5 is a cross-sectional view taken substantially along the line 5—5 in FIG. 4.
FIG. 13 is a fragmentary cross-sectional view taken along the line 13—13 in FIG. 2.
Figure 6:
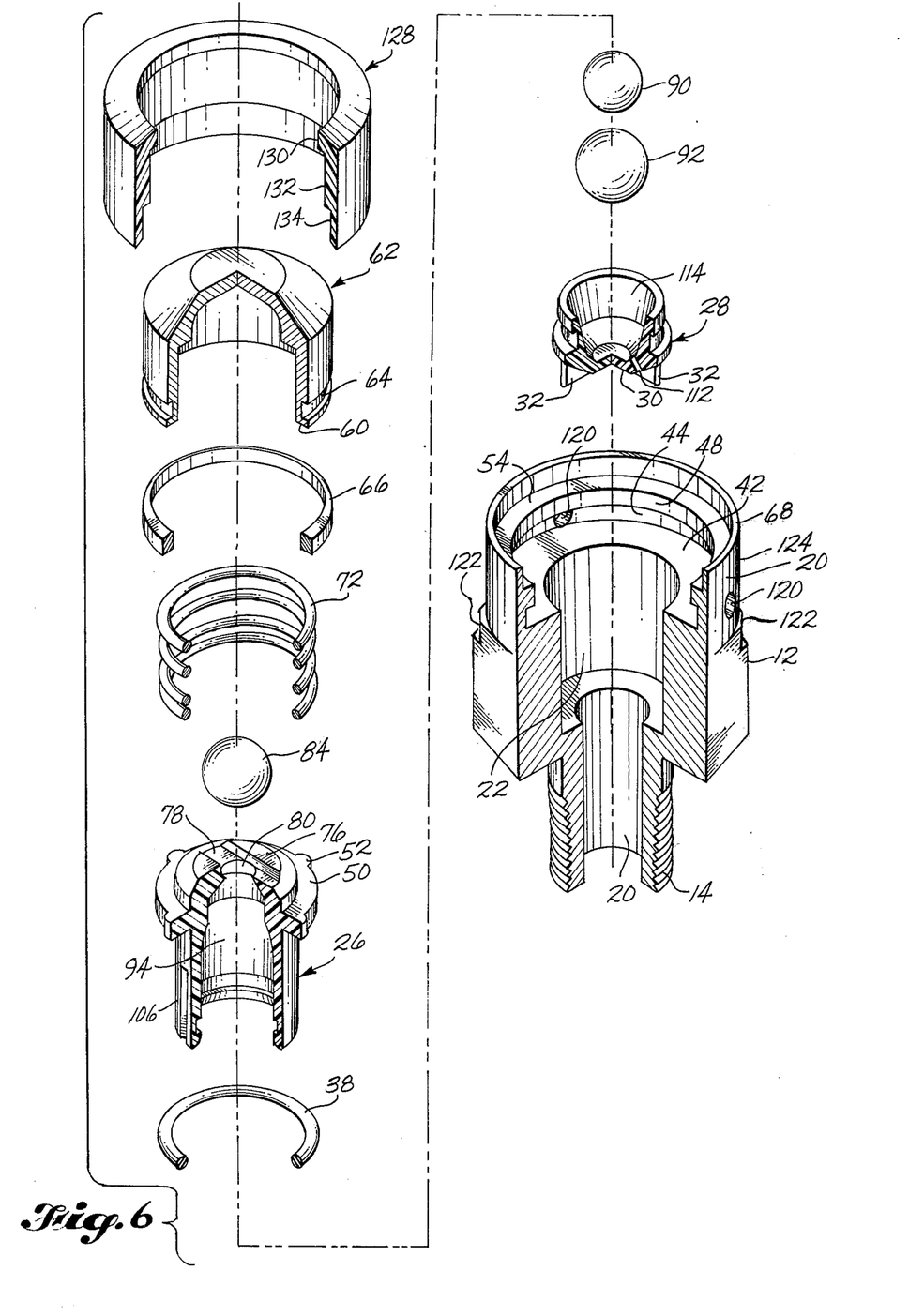
FIG. 6 is an exploded isometric view of the valve shown in FIG. 1.

A two-part housing 24 is positioned within the cylindrical bore 22, It is comprised of a generally cylindrical upper part 26, FIG. 4, and a lower part 28, FIGS. 1 and 6, the two parts being snap-fit together by means of alternate lands and grooves at 30. The housing parts are made of a resilient plastic which makes the snap-fit possible. The plastic is also relatively inert so as to not be affected by the liquid in the tank. The lower part 28 has a small diameter external bottom 30, FIG. 3, from which extends four radially-directed legs 32.

An annular passage 36 is formed in the space 22 between the outer housing wall and the cylindrical surface of the bore. Passage 20 connects the tank to the passage 36, normally sealed at its upper end by an O-ring 38 positioned on an annular shoulder 42 upwardly of the bore 22. The shoulder 42 terminates outwardly in an annular groove 44. Axially outwardly of the groove 44 is a cylindrical portion 48, forming an upper opening for the cylindrical portion 22 and of the main body of the valve 12.

An annular flange 50 extending radially outwardly from the housing portion 26 is normally sealingly engaged with the O-ring seal 38 to close the upper end of the passage 36. Four protuberances 52, annularly spaced on the circumference of the flange 50, space the housing within the cylindrical portion 22 within the opening 48.

Axially outwardly of the opening 48 is an annular shoulder 54 on which an annular inner end 60 of a valve cap 62 is sealingly engaged to close the upper end of the valve 10. Axially outwardly of the surface 60 is an annular groove 64 in which is positioned a melt, sealing ring 66 having a low melting point such as 225° F., for example. Ring 66 is held in place by crimping annular edge 68 thereover, FIGS. 1 and 6. A coil spring 72 has its upper and outer end in abutment with an upper surface of the cap and has its lower end in abutment with the upper surface of the flange 50 to hold the housing in a sealing position with respect to the passage 36 up to a tank pressure of 35 PSIG., for example.

The housing 24 has an upper and outer surface 76, FIGS. 1, 4, and 13, interrupted by a diametrically extending, substantially rectangular channel 78. The channel base is interrupted by an axially directed circular opening 80, forming an outlet for the housing 24. A heavy ball 84 is positioned to roll on channel 78 within the spring 72 as the result of the slightest tilt of the valve. The channel 78 is narrow enough to prevent the ball from extending downwardly far enough to seat on the opening 80.

Figure 8:
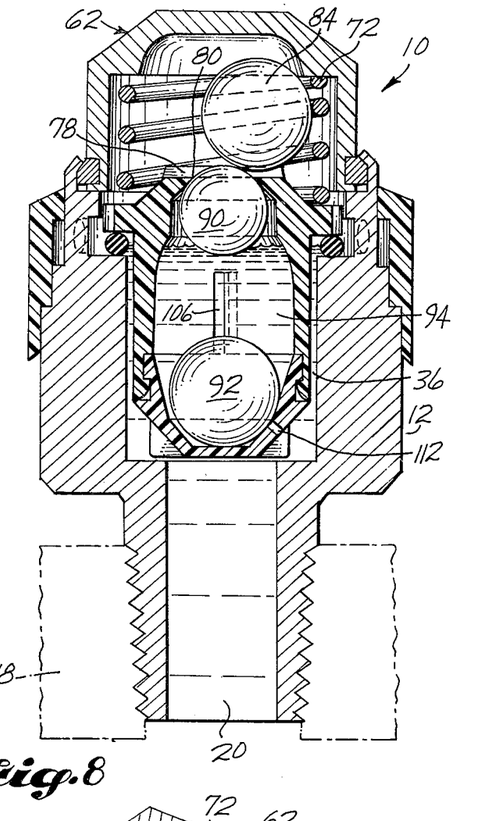
FIG. 8 is an elevational view similar to FIG. 7, illustrating the closing of the valve by a high liquid level.
Figure 10:
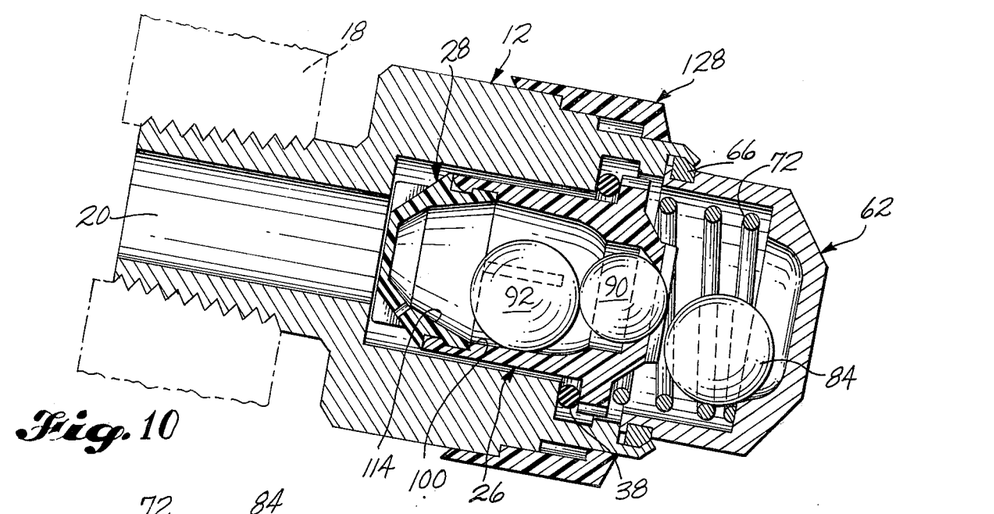
FIG. 10 is a view of the valve in which it has been tilted sufficiently to be held closed so as not to vent or spill.

At the inner end of the outlet valve 80, a valve seat 88 is formed to receive a light weight, buoyant ball 90 to close the outlet, FIGS. 8 and 10. In an inoperative position the ball, as shown in FIG. 1, rests on a lower heavy ball 92 of the same size and weight as the ball 84. The heavy balls are stainless steel and have diameters of 5/16", for example.

The housing 24 has a substantially axially, elongated hollow spin chamber 94 formed of non-uniform circular cross sections. Inwardly of the seat 88 is a cylindrical wall surface 96 having a diameter large enough to permit the ball 90 to move therethrough so as to move easily onto the smaller diameter seat. An outwardly decreasing, diameter portion starts at 100 and continues into a restraining wall portion 102 which terminates in the cylindrical portion 96. The wall portion starting at 100 and terminating at 102 is effective during venting operations to be explained.

Figure 7:
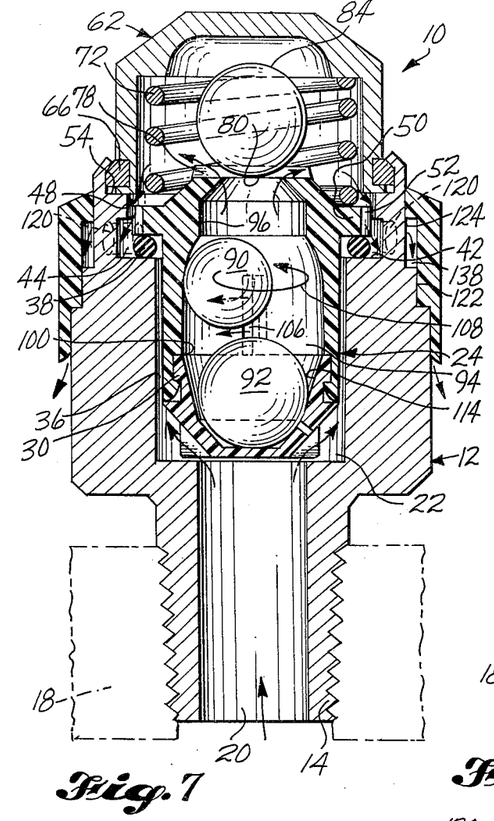
FIG. 7 is a view similar to FIG. 1, illustrating the operation within the spin chamber during venting.
Figure 9:
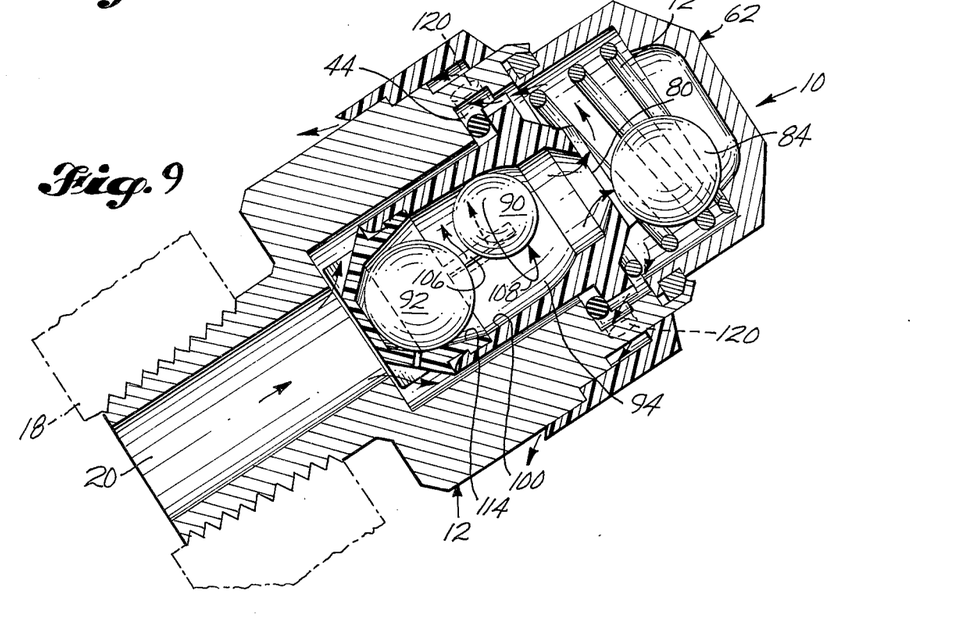
FIG. 9 is a view of the valve in a substantially tilted, venting position.

As best seen in FIGS. 1, 4, 5, and 7, there are two diametrically opposed, tangentially directed slots 106 through the wall of the upper housing portion 26 so as to connect the housing with the tank through the passages 20 and 36. Venting flow out of the tank and into the hollow chamber 94 through the tangential slots 106 causes the light weight ball 90 to spin around the chamber wall, as indicated in FIGS. 7 and 9 by the circularly directed arrows 108.

Most venting occurs during vehicle operation when fuel and entrained gases are returned from the engine to the tank. Venting also occurs when the tank is being filled and during expansion of the liquid when its temperature is raised. The ball 90 is ¼ inch in diameter, for example, and may be made of polypropylene. It is so light in weight that it would easily move upwardly to seat at 88 by the slightest venting flow if it were not for the configuration of the interior of the housing between 100 and 102 and the tangential flow through the slots 106. The inlets 106 direct the gas raising from the fuel tank tangentially into the hollow chamber 94 and this causes the ball 90 to spin, FIGS. 7 and 9, as indicated by the arrow 108, at relatively high velocity around the interior of the housing. The gas flow moves the ball upwardly along the converging surface between 100 and 102. Therefore, as the ball 90 rises it spins at a faster rate because it is forced radially inwardly by the decreasing diameters. The configuration of the wall particularly at 102 imparts a downwardly directed component to the centrifugal force on the ball and prevents it from moving on to the seat 88 during normal venting of the tank.

As shown in FIG. 8, if fuel rises in the vent for any reason, to a predetermined level upwardly through the passages 20, 36, and into the housing portion 94 so as to lift the bouyant ball 90 onto the seat 88. This action will prevent spillage to the extent that the valve will hold the pressure induced by the excessive liquid.

The seating of the ball 90 by being floated onto the seat by the liquid is most important under situations where the tank is tilted and the liquid is not increased within the tank but rises with respect to the position of the tilted valve so as to seat the ball. Thus, the tilting is prevented from causing spillage. A drain opening 112 is provided through the bottom portion of the housing to allow the liquid to drain therefrom when the level in the tank is lowered so as to be below the housing.

When the bouyant force is removed from the ball 90, the heavy ball 84, which moves freely in the channel 78, back and forth against the spring 72 at the slightest motion of the tank, would move from its position in FIG. 8 across the outlet 80 so as to move the light weight ball 90 off the seat and cause it to resume its position against the ball 92 if the tank is not venting or if the air is flowing into the tank from the exterior.

When the liquid level rises and the valve is substantially vertical, the light weight ball 90 moves onto the seat and in so moving moves the ball 84 away from the opening, ball 84 offering essentially no resistance to such movement, as shown in FIG. 8. The only function of the ball 84 is to force the light weight ball 90 off the seat after the liquid level is lowered with respect to the ball 90. The action of the ball 84 is necessary because any gas pressure in the housing portion 94 or any flow of gas therein will hold the light weight ball on the seat after the liquid is lowered.

As shown in FIG. 1 when the valve is generally vertical, the ball 92 is seated on the bottom of the interior surface of the lower member 28 of the housing. In this position an upper portion of the ball is in tangential engagement with conical internal wall surface 114, inclined upwardly and outwardly. The angle of the surface 114 is about 70° with the horizontal. This allows substantial tilting of the tank and valve FIG. 9, before the ball 92 is caused to roll on the surface 114 toward the outlet 80 of the housing. As shown in FIG. 9, the valve is constructed to perform its venting function even when the fuel tank is tilted substantially. The venting is stopped on tilt only when the ball 92 moves the ball 90 onto the seat or when the liquid level in the housing causes the ball to move onto the seat. The ball 92 does not move axially within the housing until the wall 114 dips below the horizontal position, as shown in FIG. 10. Because of its inclination the surface 114 does not reach a horizontal position until the angle of tilt is above 75°. Then the ball 92 moves along that surface until it moves onto the surface at 100, where if tilting stops, the ball should come to a position of rest until further tilting occurs. When it does, it rolls along the surface at 100 a sufficient distance to push the ball 90 onto the seat into a sealing relationship. This stops the venting of the tank and also prevents any spillage of the liquid because of the tilt, if the valve has not already sealed due to presence of liquid.

As shown in FIGS. 1, 2, 6, 7, 9, and 13, the flow passage, for venting and for inlet of air into the tank from the housing outlet 80, extends through the cap 62 around the circumference of the flange 50 of the housing into the annular groove 44 and through four passages 120 through the wall of the valve body 12. As shown in FIGS. 2 and 6, the lower portion of the body 12 is hexagonal and upper portion of the hexagonal corners at 122 are cutaway to form cylindrical corner portions. Directly above is a continuous cylindrical wall 124 through which the cylindrical passages 120 extend.

In FIGS. 1, 2, 6, 7, and 13, a generally cylindrical dust cap 128 is shown. The dust cap has three inner cylindrical surfaces 130, 132, and 134 and is fitted over the upper portion of the body 12. The cylindrical surface 132 covers the upper body wall 124 and spaced between the upper portion of the surface 132 and the wall 124 is an annular groove 138 in communication with the passages 120. The lower portion of the wall 132 is fitted over the hexagonal portion of the body and is in contact with the cutaway corners 122. The lower wall 134 is in contact with the points of the corners but no portion of the cap is in contact with the flat side portions of the hexagonal part of the body. The wall 134 is substantially spaced from the flat portions of the hexagonal and the lower portion of the wall 132 is spaced a lesser amount from the flat portions of the hexagonal to form a vertical passage 140, FIGS. 2, 3, and 13. As may be seen in FIGS. 2, 6, and 13, the passages 120 are in communication with the grooves 138 which are in communication with the vertical passages 140, open to the atmosphere, as indicated in FIGS. 7 and 9, where the venting flow is shown by the arrows.

Figures 11, 12:
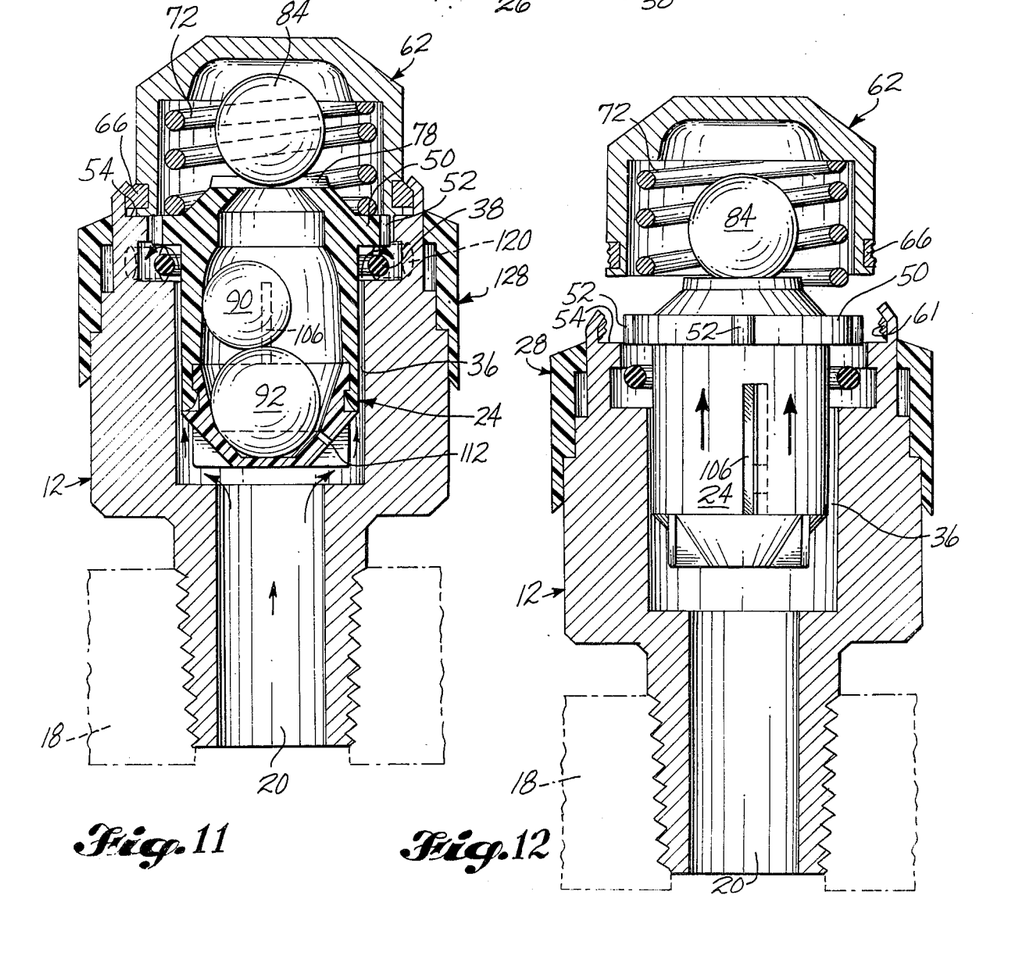
FIG. 11 is an elevational view of the valve, illustrating its operation when the tank pressure has exceeded that allowed by the valve setting.
FIG. 12 is an elevational view of the valve, illustrating its operation when the upper allowed temperature has been exceeded.

In FIG. 11, the operation of the valve is illustrated under circumstances where the pressure in the tank exceeds the stored energy force of the spring 72. Vent valves for vehicle carried fuel tanks are typically set to relieve the tank pressure when it exceeds 20 PSIG. When the pressure reaches that level the entire housing 24 is lifted, pressure being exerted on the external portions of the housing including the flange 50, which operates against the spring 72. When the flange is lifted off the O-ring 38, the tank pressure is released directly through annular passage 36 into the horizontal passages 120, open to the atmosphere through the passages 140.

In FIG. 12, the operation of the valve is shown when the temperature of the melt ring 66 exceeds its melting point, which is typically 255° F. for such installations. When this occurs the melt ring 66 disintegrates, and the spring 72 lifts the cap off the valve body so that gas or liquid can be discharged from the tank rather than have the tank explode. Under such conditions the housing 24 would typically be blown out of the valve body.

In summary, the valve 10 is shown in FIG. 1 in its normal vertical position secured adjacent the top of a fuel tank carried on a motor vehicle. Here, the valve is open for venting but venting is not occurring although air may be flowing into the tank through the valve.

In FIG. 7 the valve is shown in a normally vertical position and is venting as it would while the tank is being filled or while the gas within the tank is expanding, and thus flowing from the tank through the valve. It flows through the passage 20, into the passage 36, through the two tangentially directed, slot-shaped openings 106 in the wall of the housing 24. The tangential direction of the slots causes the gas to move in a circular direction as indicated by the arrow 108 and this causes the lightweight valve closing ball 90 to rotate around the housing chamber 94.

The spinning of the ball 90 in the decreasing diameter arrangement between 100 and 102 prevents the ball 90 from seating on its seat 88 so as to permit the valve to continue venting as required. The ball 84 never seals the opening 80 at the top of the housing and gas flows around the ball through the channel 78 into the cap 62, through the passages 120, groove 138, and the passages 140 to the atmosphere, as indicated by the arrows in FIG. 7.

In the event the liquid level rises sufficiently to cause the buoyant valve closing ball 90 to be lifted it will move onto its seat 88 and prevent the discharge of liquid through the vent valve. In FIG. 8 the vent valve is shown in the generally vertical position where a continual rise in liquid level would cause the pressure to increase so as to lift the housing flange 50 off the O-ring 38 as shown in FIG. 11. Its sealing by lifting the ball 90 onto its seat is provided more for the situation where the tank would be tilted sufficiently to cause the liquid to flow into the valve housing and be spilled if it wee not for the valve 90 being moved onto its seat.

In the situation shown in FIG. 8, the heavy ball 84 has been moved out of the vicinity of the opening 80 by the floating of the valve ball 90 onto the seat. The ball 84 is almost in constant movement during the operation of the vehicle. It is free to move in its channel back and forth against the interior of the spring 72. When the liquid level is lowered so that it no longer causes the ball 90 to float, the ball 90 would tend to remain on the seat because of the probable pressure in the tank, a very slight pressure being sufficient to hold the ball in its seating position once it has been forced there. If this should occur the ball 84 in its movement back and forth will move the valve ball 90 off of its seat to a venting position, as shown in FIG. 7 or into a non-operating position as shown in FIG. 1.

The valve has an inbetween position in which the steel ball 92 in not yet influenced by gravity to move ball 90 into a seated position and the bouyant forces are directed away from the seat. Ball 90 will still seat in the presence of liquid because it is only slightly bouyant and will be moved into a seated position by slight amounts of liquid flow.

FIG. 9 illustrates the operation of the valve during venting in a substantially tilted position. The ball 84 has been moved against the spring by the tilt and the valve ball 80 is being spun within the chamber 94 by the tangential direction of the venting flow through the housing.

In FIG. 10 the valve is shown tilted a sufficient amount to cause the ball 92 to gravitate against ball 90 and move it onto the seat 88. In this situation venting cannot occur and a spillage also cannot occur if the liquid should be of a sufficient amount to move into the valve because of the tilting.

The invention and its attendant advantages will be understood from the foregoing description and it will be apparent that various changes may be made in the form, construction, and arrangement of the parts of the invention without departing from the spirit and scope thereof or sacrificing its material advantages, the arrangements hereinbefore described being merely by way of example. We do not wish to be restricted to the specific forms shown or use mentioned except as defined in the accompanying claims.

What is claimed is:

1. In a tank venting device,
wall means defining a spin chamber having internal generally circular cross sections;
at least one side wall inlet opening into said chamber being tangentially directed with respect to said chamber cross sections, said inlet adapted to be connected to a tank containing liquid;
a circular outlet opening at a normally upper end of said chamber;
a light weight buoyant ball in said chamber, said ball having a larger diameter than said outlet opening; and
means defining said chamber cross sections to prevent said light weight ball from seating in said outlet opening when said gas is venting, whereby gas venting through the spin chamber will spin the light weight ball around the chamber;
said light weight ball being adapted to be lifted to seat on said outlet opening when liquid enters said chamber to a predetermined level to close said outlet opening and block liquid flow out through the outlet opening.

2. The invention according to claim 1 including:
a heavy ball in said chamber to hold said light weight ball on said seat when the chamber has been tilted a predetermined amount.

3. The invention according to claim 1 including:
a heavy ball externally of said chamber adjacent said outlet opening adapted to move said light weight ball off said seat when the liquid is below a predetermined level and the chamber is not tilted, so that the outlet will be open for venting.

4. The invention according to claim 1 in which:
said inlet opening is slot-shaped;
said means defining said chamber cross sections including said cross sections decreasing in area above said inlet toward and adjacent said seat so that as the diameters become smaller the spinning of the ball becomes faster to create a centrifugal force having a downwardly directed component, which during normal venting, prevents the light weight ball from moving upwardly into a seated position.

5. The invention according to claim 1 including:
a bottom surface of said chamber;
an upwardly and outwardly inclining internal surface extending from adjacent said bottom;
a heavy ball resting on said bottom when said chamber is not tilted;
said light weight ball being between said heavy ball and said outlet;
said heavy ball being adapted to move on said inclining surface to move the light weight ball to be seated on the outlet when the chamber is tilted from a generally vertical position to a position past the horizontal.

6. A passageway adapted to permit gas flow but close to liquid flow, comprising:
wall means defining a spin chamber having internal generally circular cross sections;
at least one side wall inlet opening into said chamber being tangentially directed with respect to said chamber cross sections,
a circular outlet opening at an end of said chamber;
a light weight buoyant ball in said chamber, said ball having a larger diameter than said outlet opening; and
means defining said chamber cross sections to prevent said light weight ball from seating in said outlet opening when gas is flowing through the spin chamber, whereby gas through the spin chamber will spin the light weight ball around the chamber;
said light weight ball being adapted to be lifted to seat on said outlet opening when liquid enters said chamber to a predetermined level to close said outlet opening and block liquid flow out through the outlet opening.

7. A gas venting valve comprising:
a valve body having a valve inlet and a valve outlet;
a flow passage between said valve inlet and said valve outlet in said body;
a valve member operative in said passage to close the passage when liquid enters the passage to a predetermined level;
flow means in said passage to prevent the valve member from closing the passage when the valve is venting gas;
a second member in said passage to hold said valve member to close the passage after the valve body is tilted a predetermined amount;
a housing in said body forming a portion of said passage;
said flow means including at least one housing inlet;
a housing outlet forming a portion of said passage;
said valve member being in said housing; and
a valve seat in said housing extending around said housing outlet;
said valve member being in a sealing relationship on said seat when it closes said passage;
said housing having a hollow portion in which said valve member may move toward and away from said seat;
said hollow portion being elongated, generally vertically when said valve body is positioned generally vertically and not tilted significantly;

said housing having a wall surrounding said hollow portion;

said flow means further including said housing inlet being slot-shaped through said wall and being directed tangentially into said hollow portion;

said housing outlet and said seat being above said housing inlet.

8. The invention according to claim 7 in which:

said valve member is buoyant in said liquid so that liquid entering said housing lifts said valve member to sit on said seat in a sealing relationship at said predetermined level.

9. The invention according to claim 7 in which:

said valve member is positioned in the way of said housing inlet when it is off the seat;

said valve member being sufficiently light in weight so as to be movable around said housing by gas being vented through said flow passage.

10. The invention according to claim 9 in which:

said wall having internal surfaces of non-uniform cross sections defining said hollow portion;

said flow means further including said cross sections decreasing in area above said inlet toward and below said seat.

11. The invention according to claim 9 in which:

said wall having internal surfaces of non-uniform, generally circular cross sections defining said hollow portion;

said valve member being a ball;

said flow means further including said cross sections decreasing in area above said inlet toward and adjacent said seat so that as the diameters become smaller the movement of the ball becomes faster to create a centripetal force having a downwardly directed component, which during normal venting, prevents the ball from moving upwardly into a seated position.

12. A passageway adapted to permit gas flow but close to liquid flow, comprising;

wall means defining a chamber having internal generally circular cross sections;

at least one side wall inlet opening into said chamber, said inlet opening including means to direct gas flow therethrough and into said chamber generally along the surface of said circular cross sections;

a circular outlet opening at an end of said chamber axially outwardly of and away from said inlet;

a light weight buoyant ball in said chamber, said ball having a larger diameter than said outlet opening; and means defining said chamber cross sections to prevent said light weight ball from seating in said outlet opening when gas is flowing through the chamber, whereby gas through the chamber will move the light weight ball around the chamber;

said light weight ball being adapted to be lifted to seat on said outlet opening when liquid enters said chamber to a predetermined level to close said outlet opening and block liquid flow out through the outlet opening.

13. The invention according to claim 12 in which:

said means defining said chamber cross sections include cross sections decreasing in area away from said inlet toward and adjacent said outlet opening so that as the diameters become smaller the movement of the ball becomes faster to create a centripetal force having a downwardly directed component, which during normal venting, prevents the ball from moving toward the seat on said outlet opening.

14. The invention according to claim 12 in which:

said means of said inlet opening to direct gas flow along the surface of said circular cross sections includes said inlet opening being slot-shaped, the slot being elongated in the general direction of an axis through the centers of said circular cross sections.

15. A gas venting valve comprising:

a valve body having a valve inlet and a valve outlet;

a flow passage between said valve inlet and said valve outlet in said body;

a housing in said body forming a portion of said flow passage, a housing outlet in said passage;

a circular valve seat in said housing adjacent said housing outlet;

a chamber in said housing adjacent said housing outlet and formed by a housing wall;

a light weight buoyant ball in said chamber to close the passage and outlet at the seat when liquid enters the passage to a predetermined level;

flow means in said passage and said chamber to prevent the ball from seating and closing the passage when gas is being vented, said flow means including a housing inlet through said housing wall into said chamber to direct gas flow along an inner surface of said chamber and to move said ball generally along said surface;

said flow means further including means defining said chamber between said inlet and adjacent said seat to prevent the ball from seating when the gas is flowing and moving the ball along the said surface.

16. The invention according to claim 15 in which:

said means defining said chamber between said inlet and adjacent said seat are circular cross sections decreasing in area away from said inlet and toward and adjacent said outlet opening so that as the diameters become smaller the movement of the ball becomes faster to create a centripetal force having a downwardly directed component, which during normal venting, prevents the ball from moving toward the seat.

17. The invention according to claim 16 in which:

said housing inlet is elongated in the general direction of an axis through the circular cross sections.

18. The invention according to claim 16 in which:

said housing inlet is directed generally tangentially along surfaces of said circular cross sections.

19. The invention according to claim 15 including:

a first member in said chamber to hold said light weight ball to close the passage after the valve body is tilted a predetermined amount.

20. The invention according to claim 19 in which:

said chamber has a passage portion in which said light weight ball may move toward and away from said seat;

said passage portion being elongated generally vertically when said valve body is positioned generally vertically and not tilted significantly;

a bottom surface of said chamber;

an upwardly and outwardly inclining internal surface extending from adjacent said bottom;

said first member being a heavy ball resting on said bottom when said valve body is tilted significantly;

said light weight ball being between said first member and said seat when the light weight ball is not seated;

said first member being adapted to move on said inclining surface to move the light weight ball onto the seat when the valve body is tilted from said generally vertical position to a position past the horizontal.

21. The invention according to claim 20 including: a liquid drain opening adjacent the bottom of said chamber.

22. The invention according to claim 15 including: a second member associated with said passage to move said light weight ball from closing the passage when the liquid is below a predetermined level and the valve body is not tilted, so that the passage will be open for venting.

23. The invention according to claim 15 in which: said flow passage is normally open.

24. The invention according to claim 15 including: means associated with said passage to provide additional passage area to the valve outlet when the pressure in the passage exceeds a predetermined amount.

25. The invention according to claim 15 including: means associated with said passage to substantially increase the valve outlet area when the temperature in the passage exceeds a predetermined amount.

26. A gas venting valve comprising:
a valve body having a valve inlet and a valve outlet;
a flow passage between said valve inlet and said valve outlet in said body;
a valve member operative in said passage to close the passage when liquid enters the passage to a predetermined level;
flow means in said passage to prevent the valve member from closing the passage when the valve is venting gas;
a housing in said body forming a portion of said passage;
said flow means including at least one housing inlet;
a housing outlet forming a portion of said passage;
said valve member being in said housing; and
a valve seat in said housing extending around said housing outlet;
said valve member being in a sealing relationship on said seat when it closes said passage;
said housing having a hollow portion in which said valve member may move toward and away from said seat;
said hollow portion being elongated, generally vertically when said valve body is positioned generally vertically and not tilted significantly;
said housing having a wall surrounding said hollow portion;
said flow means further including said housing inlet being directed tangentially into said hollow portion;
said housing outlet and said seat being above said housing inlet.

27. A gas venting valve, comprising:
means defining a vent passageway having a normally lower inlet end and a normally upper outlet end,
means defining an outlet orifice in said passageway bounded by a downwardly directed ball seat,
a light weight buoyant closure ball in said passageway below said ball seat, larger in diameter than said ball seat and adapted to float upwardly into seating engagement with the ball seat in response to liquid movement into said passageway,
flow directing means for gases venting through said passageway, for creating swirling gas currents during venting which act to spin said buoyant ball and dynamically influence it away from said ball seat, and
a heavy ball in said passageway below said light weight buoyant ball, adapted to move by gravity against said light weight ball, and force said light weight buoyant ball onto said seat in response to a tilting of the passageway beyond a predetermined amount.

28. A passageway adapted to permit gas flow but close to liquid flow, said passageway having a normally lower inlet and a normally upper outlet, and comprising:
wall means defining a spin chamber positioned between said inlet and said outlet, and having internal generally circular cross sections;
a circular outlet opening at the upper end of said chamber;
a closure ball in said chamber, said ball having a larger diameter than said outlet opening;
at least one side wall inlet opening into said chamber being tangentially directed with respect to said chamber cross sections, whereby gas through the spin chamber will spin the closure ball around the chamber; and
liquid flow response force means acting on said ball, for lifting said ball to seat on said outlet opening when liquid enters said chamber to a predetermined level, to in that manner close said outlet opening and block liquid flow out through the outlet opening.

29. The invention according to claim 28, wherein said closure ball is light weight and buoyant and such buoyancy provides the liquid response force means which functions when liquid enters the chamber to seat the closure ball.

* * * * *